Patented June 21, 1927.

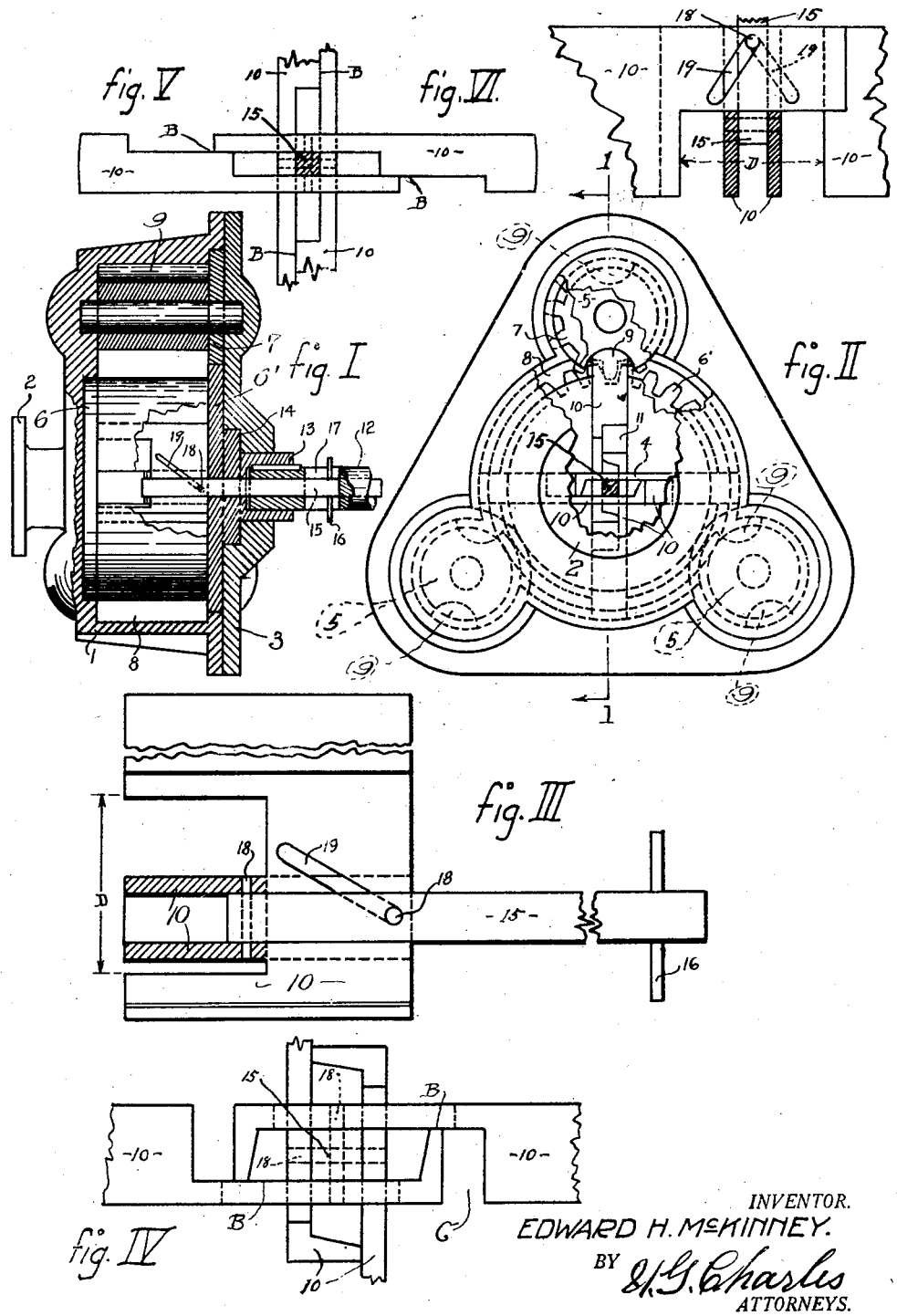

1,633,550

UNITED STATES PATENT OFFICE.

EDWARD H. McKINNEY, OF SALINA, KANSAS.

FLUID POWER TRANSMISSION.

Application filed November 27, 1925. Serial No. 71,798.

The object of my invention is to provide a fluid power transmission having a plurality of radially disposed pistons being simultaneously actuated by a central shaft.
A further object of my invention is to provide interlapping pistons attached to the shifting means in such a way that the expansion of the length by centrifugal force will be more easily controlled.
A still further object of my invention is to provide an expansion and contraction means, eliminating toggle joints and simplifying the construction.
These and other objects will hereinafter be more fully explained.
Reference being had to the accompanying drawings forming a part of this specification, and wherein like characters will apply to like parts in the different views—
Fig. I is a sectional view through the housing, and one of the rotary abutments, taken on line I—I in Fig. II, parts broken away on the rotors for convenience of illustration and description.
Fig. II is a transverse view of Fig. I, parts removed for convenience of description.
Fig. III is an enlarged detail of a fragmentary part of the pistons and the actuating shaft.
Fig. IV is a plan view of Fig. III, parts removed for lack of space to complete the extension of the pistons.
Fig. V is an edge view of a modified construction of the members of the pistons.
Fig. VI is an elevation showing the reverse angle of the slots, the transverse pistons being the same but positioned below the center as they interlock.
Referring to the drawings in detail, 1 is a housing having a necked flange 2, the said flange being means for connecting to the power shaft of the engine, 3 is a cap for said housing. In said housing is centrally positioned a rotor 4, and engaging therewith are abutments 5 seated in their respective housings, fluid tight and adapted to rotate in tight engagement with the peripheral face of the rotor. It will be understood that the working chamber 8 will be filled with fluid as a compression element. To one side of the rotor 4 is rigidly attached a disc 6, and on the opposite side is rigidly attached a gear 6', and in mesh therewith are gears 7 rigidly attached to the abutments. The said gears function as timing means for proper engagement of the pistons and the recesses 9 in the peripheries of said abutments which recesses are opposite each other on the diametrical axis.

Radially positioned in the rotor are pistons 10 slidably engaging in guide ways 11, the said pistons being in two parts interlapping and slidably engaging on each other, the joint being as at B in Figures IV and V and having an open space as at C to allow for the reciprocations of each member. The said pistons being positioned transversely to each other, are cut away as shown at D in Figures III and VI, the space being equal to the extreme movement when simultaneously operated as hereinafter described.

In Fig. I is shown a shaft 12 which is the driven shaft and connecting with the differential or driving means for a vehicle or other machine. The said shaft is rigidly connected to a collar 13 having a flange 14 integral therewith, the said flange being rigidly connected to the rotor 4 as driving means for said shaft when the pistons are expanded longitudinally engaging with outer walls of the working chamber. Slidably engaging in the end of said shaft and extending into the center of the rotor is a bar 15 having a pin 16 slidably engaging in a slot 17 in the shaft. The ends of said pin protrude sufficient to engage in a grooved collar having a yoke and pedal as shifting means for the purpose of reciprocating the shaft for effecting the movement of the pistons, (the said collar, yoke and pedal not shown in the drawings). Near the opposite end of said bar are pins 18 centrally passing therethrough and transversely positioned with respect to each other so that the outwardly extending portions of the ends thereof will engage in slots 19 functioning as cams, and as said slots are positioned at an angle and extend in opposite direction in each half of the pistons upon an inward movement of the bar the said pistons will expand longitudinally to engage in, or across the working chamber simultaneously. And as the bar is drawn in the opposite direction all of said pistons will be retracted until the ends thereof are flush with the external periphery of the rotor.

The rotor and the abutments being geared together are so timed that the ends of the approaching pistons will engage in the recesses of the abutments, should the pistons be partly extended, and when fully extended compression occurs between the abutments and the approaching pistons causing the rotor to rotate with the housing. It being understood that the housing rotates continually, being firmly attached to the drive shaft, the rotation of the driven shaft is subject to the position of the pistons in the working chamber, that is to say, when the pistons extend partly across the working chamber, the fluid in said chamber will escape compression by passing through the space between the ends of the pistons and the wall of the chamber by which means the speed of the driven shaft may vary from that of the drive shaft. Should the mechanism herein described be placed in the drive shaft of an automobile it will function as a clutch operated by the foot pedal as herein described.

Such modifications may be employed as lie within the scope of the appended claims.

Having thus described my invention, what I claim as new and desire to secure by Letters Patent is:—

1. In a fluid power transmission, a drive shaft and a driven shaft, a housing rigidly attached to the drive shaft, a rotor in said housing rigidly attached to the driven shaft, an annular working chamber circumscribing the periphery of said rotor, said chamber being filled with fluid, three rotatable abutments engaging with the peripheral face of said rotor, gears on one side of said rotor and abutments, said gears being in mesh for correct timing purposes, recesses across the faces of said abutments, divided pistons slidably engaging through the axis of said rotor, slots angling across the inner ends of the members of said pistons, said slots angling in opposite directions, a bar transversely engaging between the members of said pistons, protruding pins in said bar engaging in said slots, and means for reciprocating said bar for the reciprocation of the members of said pistons in opposite directions simultaneously for the purpose described.

2. In a fluid power transmission, a drive shaft and a driven shaft, a housing, a rotor and abutments, said rotor and abutments rotatably engaging in said housing, the housing and rotor being concentric with the shafts, divided pistons interlapping and transversely positioned in said rotor, and openings between the inner ends of said piston members, diagonal slots in the inner ends of said members functioning as cams, a lever actuated bar engaging in the openings of said pistons, pins through said bar transversely positioned, the protruding ends of said pins engaging in said slots so that by the reciprocations of said bar the outwardly extending ends of said pistons will move to or from the center simultaneously for power transmitting means from the drive shaft to the driven shaft.

3. In a fluid power transmission, a housing, a rotor centrally positioned in said housing, said rotor comprising four members quarterly positioned so that the planes thereof will form guide ways diametrically positioned and transverse to each other, divided pistons slidably engaging in said ways, a gear and a disc rigidly supporting said members, said disc rotatably seated in said housing, a hub having a flange firmly attached to said gear, a cap on said housing, said cap being bored to receive said hub, a driven shaft rigidly attached to said hub and a drive shaft attached to said housing, the said housing and rotor being concentric with said shafts, three rotatable abutments spaced at 120° relative to said rotor, gears attached to one side of said abutments, said gears in mesh with the said rotor gear as actuating means for said abutments, recesses in the faces of said abutments to receive the ends of said pistons, a bar slidably engaging in the ends of said driven shaft, pins transversely engaging through said bar, diagonal slots through the inner ends of said divided pistons, the slots in the respective divisions angling in opposite directions so that said pins engaging in said slots will reciprocate the members of said divided pistons in opposite directions while said bar is being reciprocated axially by lever means, all substantially as shown and for the purpose described.

4. In a fluid power transmission, a working chamber and rotor of the kind described, a piston slidably engaging through the rotor, said piston being in two members adapted to slide longitudinally on each other and in opposite directions, a similar piston transversely disposed with respect to said first piston and interlapping therewith, cam actuating means centrally positioned in said pistons for reciprocating the same simultaneously for the purpose described.

EDWARD H. McKINNEY.